US008427854B2

(12) United States Patent
Weinsberg et al.

(10) Patent No.: US 8,427,854 B2
(45) Date of Patent: Apr. 23, 2013

(54) UTILIZATION OF MEMORY REFRESH CYCLES FOR PATTERN MATCHING

(75) Inventors: Yaron Weinsberg, Bellevue, WA (US); John Joseph Richardson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 12/760,797

(22) Filed: Apr. 15, 2010

(65) Prior Publication Data

US 2011/0258497 A1    Oct. 20, 2011

(51) Int. Cl.
*G11C 15/00* (2006.01)
(52) U.S. Cl.
USPC ....... 365/49.17; 714/720; 714/6.13; 714/801; 714/719; 714/722; 714/737; 360/31; 365/222; 365/49.1
(58) Field of Classification Search .................... 714/720
See application file for complete search history.

(56) References Cited

U.S. PATENT DOCUMENTS

| 5,184,325 | A  | * | 2/1993 | Lipovski | .................. 365/189.07 |
| 5,758,148 | A  | * | 5/1998 | Lipovski | .............................. 1/1 |
| 6,035,420 | A  |   | 3/2000 | Liu | |
| 6,185,138 | B1 |   | 2/2001 | Brady | |
| 6,567,940 | B1 |   | 5/2003 | Kroon | |
| 6,779,141 | B1 |   | 8/2004 | Pendurkar | |
| 7,380,052 | B2 |   | 5/2008 | Bellows | |
| 7,484,154 | B2 |   | 1/2009 | Urata | |
| 2004/0083407 | A1 | * | 4/2004 | Song et al. | ....................... 714/27 |
| 2005/0081093 | A1 | * | 4/2005 | Joly et al. | ........................... 714/8 |
| 2006/0242686 | A1 | * | 10/2006 | Toda et al. | ......................... 726/3 |
| 2007/0101238 | A1 | * | 5/2007 | Resnick et al. | ............... 714/763 |
| 2008/0168317 | A1 |   | 7/2008 | Katrak | |
| 2009/0193219 | A1 | * | 7/2009 | Ohira et al. | .................... 711/170 |
| 2010/0134912 | A1 | * | 6/2010 | Koester | ............................. 360/31 |

OTHER PUBLICATIONS

Hellebrand, S.; Wunderlich, H.-J.; Ivaniuk, A.; Klimets, Y.; Yarmolik, V.N.; , "Error detecting refreshment for embedded DRAMs," VLSI Test Symposium, 1999. Proceedings. 17th IEEE , vol., No., pp. 384-390, 1999.*
Brown, Mary,et al. ; Memory Access Pattern Analysis—Published Date: 1998 http://ieeexplore.ieee.org/stamp/stamp.jsp?tp=&arnumber=809366.

* cited by examiner

*Primary Examiner* — John Trimmings
(74) *Attorney, Agent, or Firm* — Workman Nydegger

(57) ABSTRACT

Searching for patterns stored on a hardware storage device. A method includes, as part of a memory refresh operation, performing a read to read contents of a portion of a memory. The method further includes writing the read contents of the portion of memory back to the portion of memory. The read contents are provided to data comparison logic. Using the data comparison logic; the read contents are compared to predetermined data patterns. A determination is made as to whether or not the contents match at least one of the predetermined data patterns. When the read contents match at least one of the predetermined data patterns, a software readable indicator is provided indicating that the read contents match at least one of the predetermined data patterns. Similar embodiments may be implemented using hard drive head wear leveling operations.

16 Claims, 3 Drawing Sheets

UTILIZATION OF MEMORY REFRESH CYCLES FOR PATTERN MATCHING

BACKGROUND

Background and Relevant Art

Computers and computing systems have affected nearly every aspect of modern living. Computers are generally involved in work, recreation, healthcare, transportation, entertainment, household management, etc.

Within computer systems, there is often a need to detect patterns. For example, on a basic level, pattern detection can be used for search functionality. For example, comparisons of data in a set of data with a known pattern can be performed to determine if the known pattern appears in the set of data.

To optimize searches, indexes are often created. Indexes are often created by using pattern comparison to determine the location of a given pattern.

On a more insidious level, pattern detection may be used to detect harmful software. For example, a computer virus typically has a signature. Namely, when the virus is loaded into memory or appears on a storage device, binary data patterns can be used to identify the virus.

Pattern detection often requires extensive use of additional resources. In particular, large amounts of processor and memory resources may need to be dedicated to a processor reading data, the processor storing the data in portions of memory reserved for comparisons, the processor reading known patterns of data and the processor comparing the known pattern to the data stored in the memory. The processor and memory resources, while performing these actions, may not be available for other computing activities.

Some pattern detection activities are thus queued to be performed when other processing activities are not being performed. For example, antivirus software may halt system scans while other activities are being performed. In contrast, antivirus scans that take place as programs and data are loaded reduce the amount of processing power available to execute those programs and to operate on that data.

Indexing activities may be performed when it is detected that a processor is sufficiently idle over a given period of time. However, this may delay high performance of search applications as the search applications are not able to use the indexes until they are created.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a computing environment. The method includes acts for searching for patterns stored on a hardware storage device. The method includes, as part of a memory refresh operation, performing a read to read contents of a portion of a memory. The method further includes writing the read contents of the portion of memory back to the portion of memory. The read contents are provided to data comparison logic. Using the data comparison logic; the read contents are compared to one or more predetermined data patterns. A determination is made as to whether or not the contents match at least one of the one or more predetermined data patterns. When the read contents match at least one of the one or more predetermined data patterns, a software readable indicator is provided indicating that the read contents match at least one of the one or more predetermined data patterns. Similar embodiments may be implemented using hard drive head wear leveling operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Modern computers use dynamic random access memory (DRAM) as their main memory. A DRAM memory comprises cells for storing the logical values. A cell acts like a capacitor that is logically equal to a value of "1" when it is charged (e.g. within some higher voltage range), or a value of "0" when it is discharged (e.g. within some lower voltage range than the higher voltage range). As the capacitor may leak over time causing voltage levels to decay, the memory cells are refreshed. The refresh rate is determined by the memory vendor or industry standard. A typical memory refresh rate in present systems is about 64 msec. Memory refreshes are generally controlled by a memory controller that is included as part of the memory hardware. The memory controller may include a refresh controller which operates independent of other system hardware. For example, the refresh controller may refresh the memory without specific direction to do so by any other processor in the system external to the memory controller, such as the CPU.

While a refresh operation is in progress by the refresh controller, the memory is disabled from being accessed (read or write) by the CPU. In addition, in legacy systems, refresh cycles consume power while no useful work other than refreshing the memory logic is achieved. However, embodiments described herein can leverage the refresh operation for other useful activities. Specifically, embodiments can use memory refresh processes for pattern matching.

Figure 1:
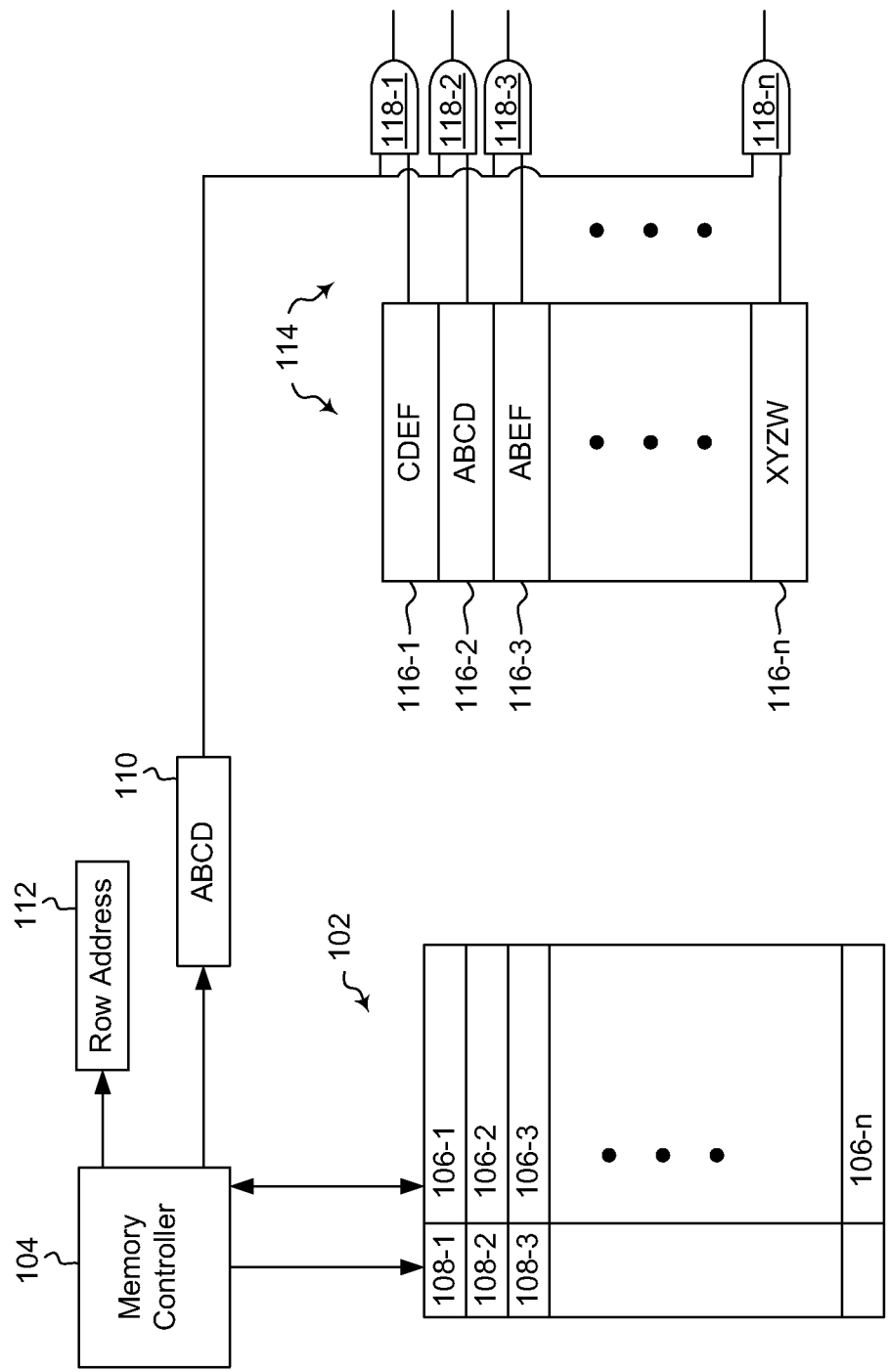
FIG. 1 illustrates a memory refresh pattern searching circuit.

Referring now to FIG. 1, an illustrative embodiment is shown. FIG. 1 illustrates a memory 102, which may be for example, a DRAM memory or other appropriate memory. Connected to the memory 102 is a memory controller 104. One of the functions of the memory controller is to refresh the memory 102. This is done by the memory controller 104 reading a memory row (referred to generally as 106, but shown with specificity as 106-1, 106-2, 106-3, ... 106-n) and rewriting the same data that was read from the memory row 106 back to the memory row 106 from which it was read. This essentially restores capacitor voltage values back to a higher level than at the read, where the lower voltage levels at the read are caused by decaying voltages. The memory rows 106 are typically accessed by using addresses (referred to generally as 108, but shown with specificity as 108-1, 108-2, 108-3, ... 108-n) corresponding to the rows.

Embodiments may leverage the memory controller's actions in reading the memory 102 to perform pattern matching functionality. For example, FIG. 1 illustrates an embodiment that further includes a data buffer 110 and an address buffer 112. When the memory controller 104 reads a memory row 106, the memory controller also identifies an address 108. The address identified can be stored in the address buffer 112. When the memory controller 104 reads a row 106 for the address 108 as part of a refresh operation, the read data from the row 106 can be stored in the data buffer 110 as well as being written back to the memory at the same row 106 as part of a refresh operation.

FIG. 1 further illustrates a content addressable memory (CAM) 114. The content addressable memory includes a number of rows (referred to herein generally as 116, but shown with specificity as 116-1, 116-2, 116-3 ... 116-n). A content addressable memory differs from other memory such as the memory 102 in that content addressable memory can very quickly search each row 116, in some cases in a single operation, for data that matches input data. In the example shown, each row is connected to a logical AND gate (referred to herein generally as 118, but shown with specificity as 118-1, 118-2, 118-3, ... 118-n). The AND gate 118 for each row 116 matches input, in this case data in the data buffer 110) with patterns stored, one for each row 116, in the CAM 114. Using the address buffer 112, a determination can be made where any matched patterns can be found in the memory 102. Thus, very quick searching for patterns can be accomplished leveraging reads that are already performed as part of a refresh operation.

A CAM 114 of size M, can be configured to hold M/w rows, where w is the CAM width. Choosing "w" as the system's memory 102 row/column will enable systems to perform a CAM search operation against M/w patterns in a single CAM cycle.

The CAM 114 can be populated by the system's operating system with a set of patterns for a specific application. The mechanism used for populating the CAM 114 memory can be exported to the system developer much like the mechanism used to populate the CPUs page tables for virtual memory support. In particular, the CAM 114 can present the pattern matching inputs and outputs either as a set of registers, or a reserved area of memory. If a reserved area of memory is used, registers would point to this area. In both cases, data values to search for with their search keys are presented to the matching hardware. After a full set of refresh cycles have completed, the results of any matches are output. The mechanism of this input/output may be a device register or i/o port which provides access to the storage for the matches. The main CPU could poll for these values when a match is completed, or arrange for an interrupt to notify it. To minimize the overhead on the main CPU to manage the data input and output registers, logic included with the CAM 114 could consult a table stored within a portion of the memory itself. The main CPU would just have to place this data there, update the CAM registers to note this location, and length, and results can be placed back into the same memory. This would allow the CPU to present batches of operations, and return results in batches. Logic within the CAM's would know to skip over this region of memory so as to not match against its own input pattern(s). The model here is in memory tables, to describe inputs and outputs, and in this case, the CAM's matching hardware would appear similar to a device peripheral to the system.

Thus, a programmatic interface may be provided to a developer to allow the developer to implement functionality for determining what patterns to search and to add those patterns to the CAM for later searching.

In this scheme, each time a DRAM row 106 is refreshed, data read as part of the refresh operation is transferred to the CAM circuit 114 in parallel to the sensing logic (that responsible to implement the refresh/recharge logic, e.g. the memory controller 114). The output of CAM logic (e.g. the output of the AND gates 118 directly or indirectly or other types of logic not shown) is propagated to the operating system. The operating system is then able to read out which rows 106 had hits on programmed patterns by referencing the address buffer 112.

The operating system can then re-arm for another search, or continue the search until a full pattern is identified. For example, the operating system can replace any patterns in the CAM 114 that have been found with different patterns. In some embodiments, the replacement patterns may be additional portions of a larger pattern. Thus, the pattern matching may be done in a piecewise fashion where different portions of a pattern are searched for at different times. When a sufficient amount of a pattern has been identified, or when a full pattern has been identified by identifying all of the pattern's parts, then a particular action can be taken. For example, if the pattern represents a virus signature, then once a sufficient amount of the pattern or all of the pattern has been identified, then virus removal tools may be activated and used to remove the virus.

While the example illustrated above uses a CAM, alternative embodiments may use a Ternary Content Addressable Memory (TCAM) for the pattern matching logic. A TCAM is similar to a CAM, as illustrated in FIG. 1, and is an advanced memory chip that can store three values for every bit: zero, one and "don't care". Thus, the TCAM can search on partial patterns, as will be illustrated later herein. For example, if the CAM 114 in FIG. 1 were a TCAM, and the entry in row 116-2 were ABC?, and the entry in row 116-3 were AB??, where ? stands for "don't care" then the both the entries in 116-2 and 116-3 would match the entry in the data buffer 110.

A TCAM of size M, can be configured to hold M/w rows, where w is the TCAM width. Choosing "w" as the system's memory 102 row/column will enable systems to perform a TCAM search operation against M/w patterns in a single TCAM cycle.

The TCAM can be populated by the system's operating system with a set of patterns for a specific application. The mechanism used for populating the TCAM memory can be exported to the system developer much like the mechanism used to populate the CPUs page tables for virtual memory support.

In this scheme, each time a DRAM row 106 is refreshed, it is transferred to the TCAM circuit in parallel to the sensing logic (that responsible to implement the refresh/recharge logic). The output of TCAM logic is propagated to the operating system. The operating system would be able to read out which rows had hits on programmed patterns. The operating system can then re-arm for another search, or continue the search until a full pattern is identified.

Thus, embodiments may implement schemes for utilizing the memory (such s DRAM) refresh cycles for memory pattern matching (using a fast TCAM memory and/or proprietary logic). In some embodiments, the patterns may be system specific and may be set by the host's operating system.

Further, some embodiments may use faster refresh rates than 64 msec. With faster refresh rates than standard refresh rates, e.g. with rates higher than 64 msec, embodiments could perform faster searches, or more unique searches per second.

Some embodiments may have multiple address buffers 112 and data buffers 110. For example, one embodiment could have two sets of pattern match registers. One set currently active and "searching" in the current refresh cycle, and another set to be active in the next. This allows software to pipeline searches with different patterns and not miss a refresh cycle processing a previous set of results.

The applications can vary according to the chosen set of patterns. The following illustrates several examples of patterns that can be searched.

The patterns may be a set of virus signatures. The signatures can be broken into fixed widths and the operating system can keep a track on the set of pattern matches. When a full virus pattern is matched, the operating system can take proper actions.

Embodiments can be used for biometric recognition, such as fingerprint or facial recognition.

Embodiments may be able to track or find patterns related to graph traversal. For example, optical character recognition and speech to text applications often use graph traversal using pattern matching.

Embodiments may be implemented to facilitate debugging support. A debugger break can be automatically triggered based on memory pattern.

Embodiments may be implemented to facilitate building web search patterns.

Embodiments may be implemented to facilitate garbage collection algorithms.

Embodiments may be implemented to facilitate a general "content addressable memory" service made available to applications that can scan the entire machines memory in a single refresh cycle.

As illustrated above, embodiments connect computer memory to sensing logic used to implement the memory refresh operation, such as by connecting memory to a fast TCAM memory or proprietary logic registers. The TCAM or proprietary logic registers are populated with patterns defined by the system's operating system. Comparisons can be made across an entire memory row that is accessed as part of the refresh/addressing cycle.

In the case of custom logic registers, a set of parallel registers can be programmed to match multiple patterns simultaneously. The match registers may include storage to record the number of the row that has a match.

Software that set up an in memory search can "assemble" or "compile" the values for the match registers for specific chips and/or memory arrays based on what patterns are being looked for, and where.

While embodiments are shown using memory systems, similar embodiments may be implemented using disk-drive systems as well. For example, some disk drives implement wear leveling. Wear leveling is implemented to reduce the amount of wear and risk of hard drive damage at a particular location on a hard drive disk. In particular, many modern hard drives cause the hard drive disks or platters to continue spinning even when data is not being read from the drive. This is done because starting a disk spinning can take a significant amount of time and thus lengthen the amount of time required to fetch data from the hard drive when data from the hard drive is required. However, if the head of the hard drive remains radially in a constant location, sectors in that location may be subject to greater wear or risk of head/disk contact, which can ultimately result in data loss. Thus, some drives implement wear leveling whereby the head position is changed at a predetermined interval.

The head reads data while the disk is spinning, but the data is not transferred to memory or processors external to the disk drive. However, the disk spinning and wear leveling movement of the head can be leveraged to accomplish pattern matching functionality similar to the pattern matching functionality shown in FIG. 1. An example is illustrated in FIG. 2.

Figure 2:
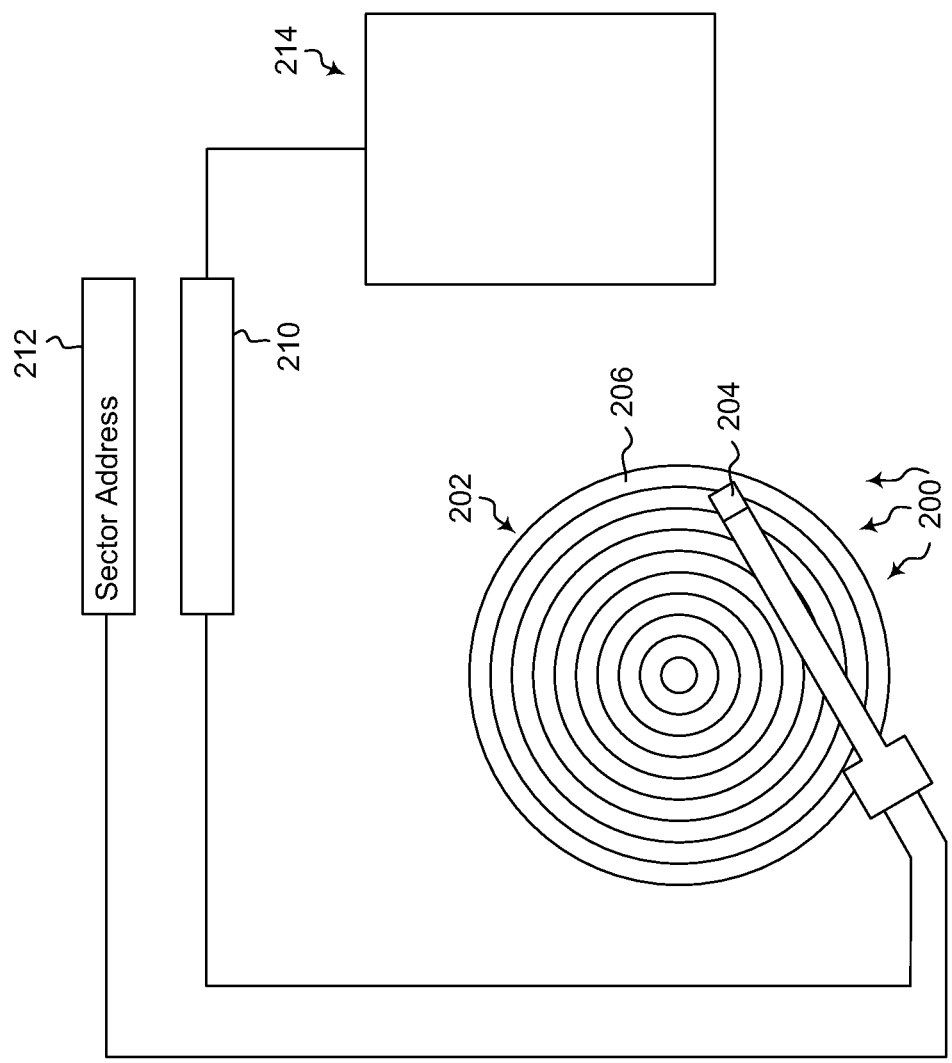
FIG. 2 illustrates a hard drive wear leveler pattern searching circuit.

FIG. 2 illustrates a disk drive 200. The disk drive 200 includes one or more disks 202. One or more heads 204 read sectors 206 on the disk 202. As noted, the disk 202 may spin to reduce start-up read times and the head 204 may be moved to different sectors 206 to accomplish wear leveling.

In the example illustrated, rather than simply discarding data read by the head 204 during time saving spinning and wear leveling operations, the data could be fed into a data buffer 210. Additionally, based on the head 204 position or information read from the disk 202, information about the location of a sector 206 being read could be stored in an address buffer 212. FIG. 2 further illustrates a pattern buffer 214. The pattern buffer 214 may be a CAM, TCAM, custom logic, etc. as discussed and illustrated above in the example illustrated in FIG. 1. Thus, the address buffer 212, the data buffer 210 and the pattern buffer 214 can be used in conjunction in a fashion similar to that illustrated above in FIG. 1 for memory to scan a hard drive 200 for patterns.

Illustratively, as the disk 202 spins, the head 204 is positioned over a sector 206. While the disk 202 spins, the head 204 reads data from the sector 206. The data read could be stored to a data buffer 210 instead of being discarded. Additionally, the position of the head 204 can be used to identify a sector address which can be stored in the sector address and buffer 212. Thus, comparisons can be made between the data stored in the data buffer 210 and the pattern buffer 214.

During a wear of leveling operation, they head 204 may be moved to a new sector 206. The new position of the head 204 can be recorded in the sector address buffer 212 and any data read by the head 204 as the disk 202 spins could be stored in the data buffer 210. Comparisons of a pattern in the pattern buffer 214 could be made against the data in the data buffer 210 as illustrated in the example above illustrated in FIG. 1. The pattern searching can be used to implement a number of different functionalities including but not limited to those illustrated previously herein in conjunction with the description of FIG. 1.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
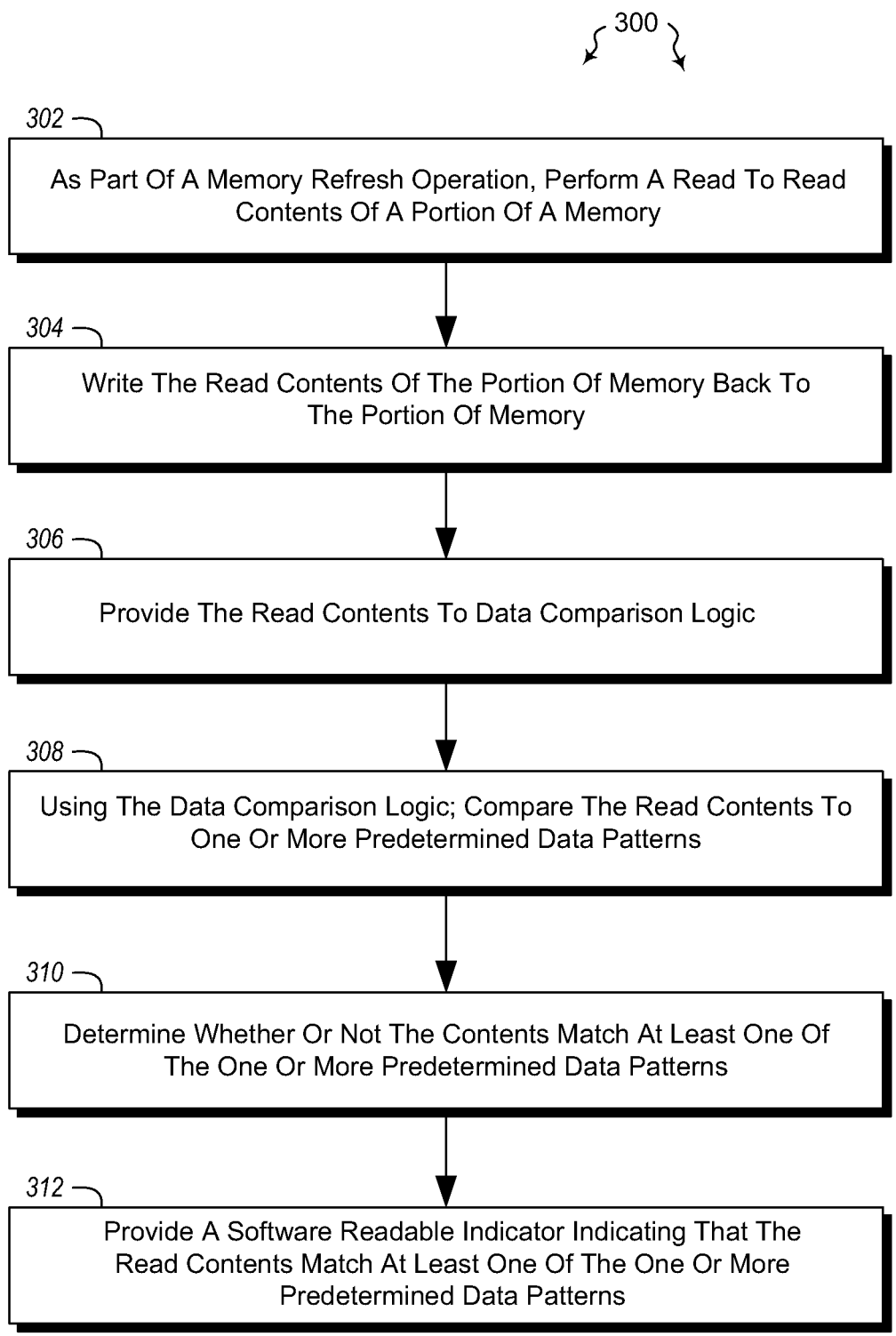
FIG. 3 illustrates a method of searching for patterns stored on a hardware storage device.

Referring now to FIG. 3, a method 300 is illustrated. The method 300 may be practiced in a computing environment.

The method 300 includes acts for searching for patterns stored on a hardware storage device. The method 300 includes as part of a memory refresh operation, performing a read to read contents of a portion of a memory (act 302). For example, as illustrated in FIG. 1, the memory controller 104 may read a memory 102 as part of a refresh operation to refresh my memory 102.

The method 300 further includes writing the read contents of the portion of memory back to the portion of memory (act 304). For example, the memory controller 104 may write back data that is read from a memory row 106 to the same memory row from which it was read.

The method 300 further includes providing the read contents to data comparison logic (act 306). For example, as illustrated in FIG. 1, the memory controller 104 may write the read contents to the data buffer 110.

The method 300 may further include using the data comparison logic; comparing the read contents to one or more predetermined data patterns (act 308). For example, FIG. 1 illustrates that the data in the data buffer $110^{th}$ is compared it to search patterns stored in a content addressable memory 114.

The method 300 further includes determining whether or not the contents match at least one of the one or more predetermined data patterns (act 310).

The method 300 further includes when the read contents match at least one of the one or more predetermined data patterns as a result providing a software readable indicator indicating that the read contents match at least one of the one or more predetermined data patterns (act 312).

The method 300 may further include dynamically adding or changing one or more of the one or more predetermined data patterns when the read contents match at least one of the one or more predetermined data patterns. For example, when a data pattern from the CAM 114 is matched with the data in the data buffer 110, the patterns stored in the CAM 114 may be changed to search for different patterns and/or different portions of a larger pattern. For example, the method 300 may be practiced where dynamically adding or changing one or more of the one or more predetermined data patterns is performed in response to determining that the contents the contents match at least one of the one or more predetermined data pattern. Alternatively, the method 300 may be practiced where dynamically adding or changing one or more of the one or more predetermined data patterns is performed to search for a different portion of a larger data pattern. For example, the pattern matching between the pattern in the data buffer 110 and a pattern in the TCAM 114 may be the matching of a larger pattern that includes the matched pattern in the data buffer 110.

The method 300 may further include, when the read contents match at least one of the one or more predetermined data patterns determining a probability of a larger pattern including the read contents as a portion of the larger pattern being in the memory.

The method 300 may be practiced where the data comparison logic comprises a Ternary Content Addressable Memory (TCAM). In this example, the method may further be practiced where determining whether or not the contents match at least one of the one or more predetermined data patterns includes matching a don't care entry in the TCAM with any data.

The method 300 may be practiced where, wherein reading contents of a portion of a memory is performed as part of a memory row refresh.

The method 300 may be practiced where software readable indicator include programmatic registers. For example, the computer architecture may include registers that can be set when a pattern match occurs. The registers can be read programmatically, such that a computer programmer can use hardware features in search operations.

The method 300 may be practiced where memory locations of the memory are used to store predetermined data patterns and for storing the software readable indicator indicating that the read contents match at least one of the one or more predetermined data patterns. Thus, in some embodiments, the memory that is being searched for patterns may include the patterns in a location of the memory set apart for these patterns. In some versions of this embodiment, the memory locations of the memory that are used to store predetermined data patterns are not compared with the predetermined patterns to determine whether or not the contents match at least one of the one or more predetermined data patterns. Otherwise, this could result in a pattern to be compared being compared with itself, giving a false positive.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment a method of searching for patterns stored on a hardware storage device, the method comprising:
    as part of a memory refresh operation, performing a read to read contents of a portion of a memory;
    writing the read contents of the portion of memory back to the portion of memory;
    providing the read contents to data comparison logic as part of the memory refresh operation by reading into a buffer in addition to writing back to the portion of memory;
    using the data comparison logic; comparing the read contents to one or more predetermined data patterns by comparing the contents of the buffer with one or more predetermined data patterns;
    determining whether or not the read contents match at least one of the one or more predetermined data patterns;
    when the read contents match at least one of the one or more predetermined data patterns providing a software readable indicator indicating that the read contents match at least one of the one or more predetermined data patterns; and
    when the read contents match at least one of the one or more predetermined data patterns, determining a probability of a larger pattern including the read contents as a portion of the larger pattern being in the memory.

2. The method of claim 1, further comprising dynamically adding or changing one or more of the one or more predetermined data patterns when the read contents match at least one of the one or more predetermined data patterns.

3. The method of claim 2, wherein dynamically adding or changing one or more of the one or more predetermined data patterns is performed to search for a different portion of a larger data pattern.

4. The method of claim 1, wherein the data comparison logic comprises a Ternary Content Addressable Memory (TCAM), and wherein determining whether or not the contents match at least one of the one or more predetermined data patterns comprises matching a don't care entry in the TCAM with any data.

5. The method of claim 1, wherein reading contents of a portion of a memory is performed as part of a memory row refresh.

6. The method of claim 1, wherein providing a software readable indicator comprises indicating using programmatic registers.

7. The method of claim 1, wherein memory locations of the memory are used to store predetermined data patterns and for storing the software readable indicator indicating that the read contents match at least one of the one or more predetermined data patterns.

8. The method of claim 7, wherein data in the memory locations of the memory that are used to store predetermined data patterns are not compared with the predetermined patterns to determine whether or not the contents match at least one of the one or more predetermined data patterns.

9. In a computing environment a method of searching for patterns stored on a hardware storage device, the method comprising:
    as part of a hard drive head wear leveling operation, reading contents of a portion of a hard drive;
    providing the read contents to data comparison logic as part of the hard drive wear leveling operation by reading data into a buffer in addition to performing hard drive head wear leveling;
    using the data comparison logic; comparing the read contents to one or more predetermined data patterns by comparing the contents of the buffer with one or more predetermined data patterns;
    determining whether or not the read contents match at least one of the one or more predetermined data patterns; and
    when the read contents match at least one of the one or more predetermined data patterns as a result providing a software readable indicator indicating that the read contents match at least one of the one or more predetermined data patterns.

10. The method of claim 9, further comprising dynamically adding or changing one or more of the one or more predetermined data patterns when the read contents match at least one of the one or more predetermined data patterns.

11. The method of claim 10, wherein dynamically adding or changing one or more of the one or more predetermined data patterns is performed to search for a different portion of a larger data pattern.

12. The method of claim 9, further comprising, when the read contents match at least one of the one or more predetermined data patterns determining a probability of a larger pattern including the read contents as a portion of the larger pattern being on the hard drive.

13. The method of claim 9, wherein the data comparison logic comprises a Ternary Content Addressable Memory (TCAM), and wherein determining whether or not the contents match at least one of the one or more predetermined data patterns comprises matching a don't care entry in the TCAM with any data.

14. The method of claim 9, wherein providing a software readable indicator comprises indicating using programmatic registers.

15. In a computing environment a system for searching for patterns stored on a hardware storage device, the system comprising:

- a memory device, wherein the memory device comprises a plurality of memory rows, wherein data values are stored in the memory rows and wherein data values are indicated by voltages in a higher voltage range for a first value and a lower voltage range for a second value, and wherein voltages in the memory rows decay over time;
- a memory controller coupled to the memory device, wherein the memory controller is configured to read values from memory rows and to rewrite the values to the same rows from which the values were read;
- an address buffer coupled to the memory controller, wherein the memory controller is configured, as part of a memory refresh operation, to indicate to the address buffer a memory row address for data being read by the memory controller, wherein the memory row address is stored at the address buffer;
- a data buffer coupled to the memory controller, wherein the memory controller is configured, as part of a memory refresh operation, to provide to the data buffer data read from the memory device, such that the address buffer includes an indication of the row address for the data stored in the data buffer;
- data comparison logic coupled to the data buffer, wherein the data comparison logic compares data in the data buffer with one or more predetermined data patterns stored in the data comparison logic and provides an indication when data in the data buffer matches at least one of the one or more predetermined data patterns, wherein the data comparison logic comprises a content addressable memory.

16. The system of claim 15, wherein the data comparison logic comprises a ternary content addressable memory.

* * * * *